US011010388B2

(12) United States Patent
Basavaraj et al.

(10) Patent No.: US 11,010,388 B2
(45) Date of Patent: May 18, 2021

(54) INFORMATION HANDLING SYSTEM TO UTILIZE MULTIPLE PARAMETERS TO ADJUST THE BEHAVIOR OF A LIVE SYSTEM

(71) Applicant: Dell Products, LP, Round Rock, TX (US)

(72) Inventors: Asha Basavaraj, Round Rock, TX (US); Richard L. Claice, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 230 days.

(21) Appl. No.: 15/010,540

(22) Filed: Jan. 29, 2016

(65) Prior Publication Data

US 2017/0220637 A1 Aug. 3, 2017

(51) Int. Cl.

*G06F 7/00* (2006.01)
*G06F 17/30* (2006.01)
*G06F 16/2457* (2019.01)

(52) U.S. Cl.

CPC .............................. *G06F 16/24575* (2019.01)

(58) Field of Classification Search

CPC ......... G06F 17/30448; G06F 17/30474; G06F 17/30457; G06F 16/24575
USPC ................................ 707/721, 728, 731, 723
See application file for complete search history.

(56) References Cited

U.S. PATENT DOCUMENTS

| | | | | |
|---|---|---|---|---|
| 9,165,089 | B2 | 10/2015 | Rodriguez et al. | |
| 2012/0059843 | A1 | 3/2012 | O'Donnell | |
| 2013/0110823 | A1* | 5/2013 | Su | G06F 17/30867 707/723 |
| 2013/0254035 | A1* | 9/2013 | Ramer | G06Q 30/0267 705/14.62 |

* cited by examiner

*Primary Examiner* — Md I Uddin
(74) *Attorney, Agent, or Firm* — Larson Newman, LLP

(57) ABSTRACT

An information handling system includes a memory to store combined behavioral data and interactional data associated with search queries, and a processing device. The processing device communicates with the memory. The processing device receives a first search query including first search terms, and user context associated with the first search query, retrieves the combined behavioral data and interactional data from previous search queries, analyzes the first search terms using the combined behavioral data and interactional data, generates signals based on the first search terms, the user context, and the combined behavioral data and interactional data, and provides the signals for use in altering results to be provided in response to the first search query.

20 Claims, 9 Drawing Sheets

100

Information handling system 104
Processing Device 120
Application 122

Information handling system 106
Processing Device 130
Application 132

Network 108

Information handling system 102
Processing Device 110
Applications 112

Data
109

INFORMATION HANDLING SYSTEM TO UTILIZE MULTIPLE PARAMETERS TO ADJUST THE BEHAVIOR OF A LIVE SYSTEM

CROSS REFERENCE TO RELATED APPLICATIONS

Related subject matter is contained in co-pending U.S. Patent Application No. 15/010,523 entitled "Information Handling System to Calculate Probabilistic Strategies for a Search Query," filed on Jan. 29, 2016, the disclosure of which is hereby incorporated by reference.

Related subject matter is contained in co-pending U.S. Patent Application No. 15/010,533 entitled "Information Handling System to Alter Results for a Query Based on Strategic Inference," filed on Jan. 29, 2016, the disclosure of which is hereby incorporated by reference.

FIELD OF THE DISCLOSURE

The present disclosure generally relates to information handling systems, and more particularly relates to an information handling system to calculate probabilistic strategies for a search.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination. Information handling systems may process events, such as communications over a network and online customer purchases.

SUMMARY

An information handling system includes a processing device, and a memory to store a first search query including first search terms, and user context associated with the first search query. The processing device generates a first probabilistic strategy for the first search query based on the signals and a first result strategy. The first probabilistic strategy indicates a probability that the search query is directed to the first result strategy. The processing device also creates an overall strategy for the search query based on the first probabilistic strategy, and provides the overall strategy for use in altering results to be provided in response to the first search query.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
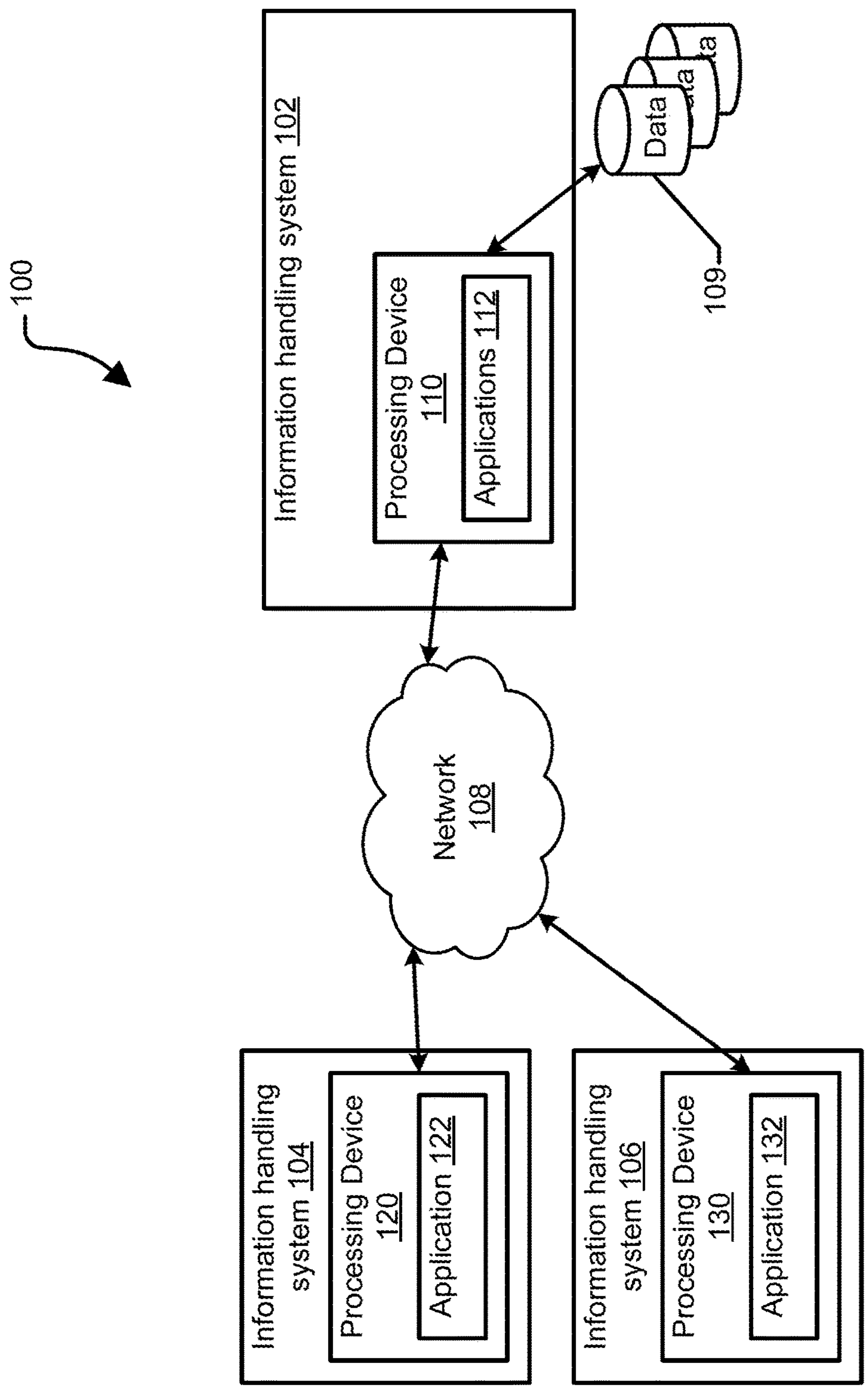
FIG. 1 is a block diagram of multiple information handling systems according to an embodiment of the present disclosure.

FIG. 1 illustrates a block diagram of information handling systems 102, 104, and 106. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer (desktop, laptop, all-in-one computer, etc.), a consumer electronic device, a network server or storage device, a switch router, wireless router, or other network communication device, a network connected device (cellular telephone, tablet device, etc.), or any other suitable device, and can vary in size, shape, performance, price, and functionality and price. The information handling system can also be implemented as or incorporated into various devices, such as a laptop computer, a tablet computer, a set-top box (STB), a mobile information handling system, a palmtop computer, a desktop computer, a communications device, a wireless telephone, a smart phone, a wearable computing device, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the information handling system can be implemented using electronic devices that provide voice, video or data communication. Further, while a single information handling system 100 is illustrated in FIG. 1, the term "system" shall also be taken to include any collection of systems or sub-systems that individually or jointly execute a set, or multiple sets, of instructions to perform one or more computer functions.

The information handling system 102 is in communication with the information handling systems 104 and 106 via a network 108. The information handling system 102 includes a processing device 110, which in turn can execute one or more applications 112. The information handling system 104 includes a processing device 120, which in turn executes one or more applications 122. The information handling system 106 includes a processing device 130, which in turn can execute one or more applications 132. The processing device 110 is in communication with databases 109. In different embodiments, the databases 109 can be external to the information handling system 102, as shown in FIG. 1, can be internal to the information handling system, or the like.

In an embodiment, the information handling system 102 can be server that hosts one or more website domains, webpages, or the like, such as a customer support website, an e-commerce website, an informational website, or the like. In an embodiment, the data for the different websites can be stored in information storage modules and/or databases 109. The processing device 120, of information handling system 102, can execute the application 122 which can cause the processing device 102 to initiate an Internet Protocol (IP) communication with the information handling system 102 via the network 108. In an embodiment, the IP communication between the processing device 120 and the information handling system 102 can enable an individual to access and view, via the information handling system 104, one or more websites or web pages or documents associated with the information handling system 102.

During operation, the processing device 120 can provide a search query command and user context to the processing device 110, which in turn can provide results generated based on the search query command and user context back to the processing device 120. In an embodiment, the user context can include but is not limited to past interactions with the websites of the information handling system 102, such as items clicked, items viewed, items purchased, items downloaded, or the like, the location of the information handling system 104, the language that the search query is made in, or the like. After receiving the results, the processing can display results for the individual on a display device in communication with the information handling system 104. In an embodiment, the results can be but are not limited to, text results, markup languages that may include hyperlinks to different webpages managed by the information handling system 102. The individual can then utilize the processing device 120 to select one or more of the results, and the processing device 120 can communicate the selection to the processing device 110. The processing device 110 can then provide the processing device 120 with data identified by the selected result, such as data of a webpage. In an embodiment, the processing device 110 can store the search query, the result selected in response to the search query, the associated user context, and any other data received during the communication between the processing device 110 and the processing device 120.

Similarly, the processing device 130 can execute application 132, which can cause the processing device 130 to communicate with the processing device 110 in a similar manner as described above with respect to processing device 120. The processing device 110 can also store the search query, the user context, and the selections of the results by the processing device 120. The processing device 110 can continue to collect and store similar information from all information handling systems that communicate with information handling system 102. The processing device 110 can then execute the different applications 112 to utilize the collected information to adjust the presentation and behavior of the processing device 110 during an active communication with another processing device as will be discussed in greater detail with respect to FIGS. 2-5 below.

Figure 2:
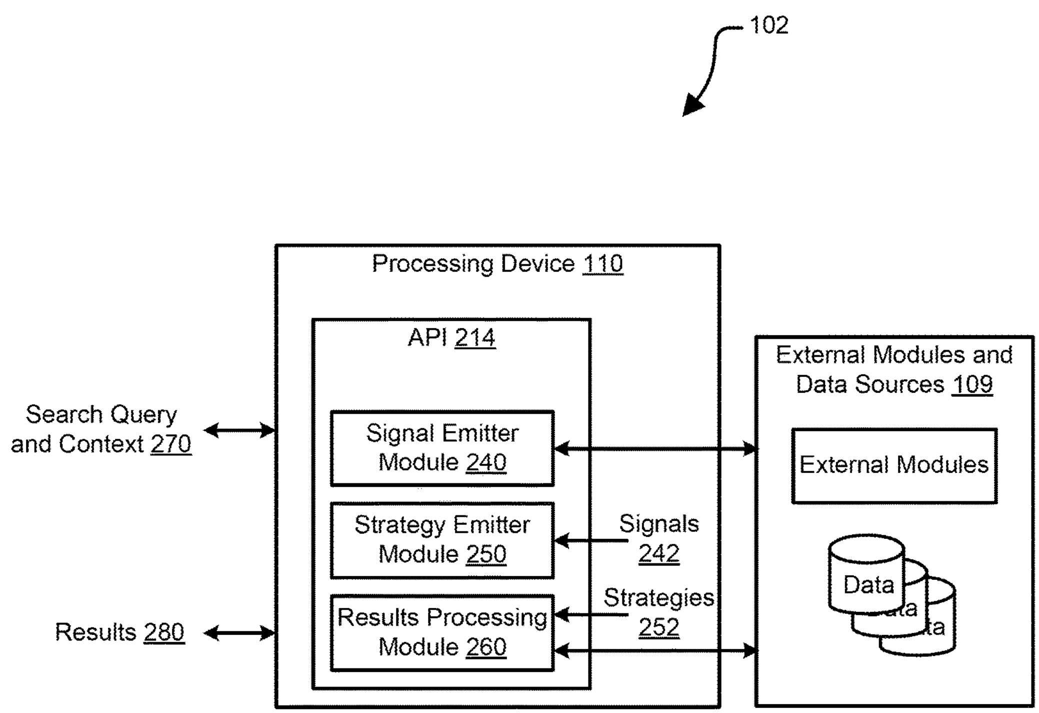
FIG. 2 is a block diagram of an information handling system including a processing device according to an embodiment of the present disclosure.

FIG. 2 illustrates a block diagram of information handling system 102 including processing device 110 and the external modules and information data 109 according to an embodiment of the present disclosure. The processing device 110 can include an application programming interface (API) 214, which in turn can provide communication between a signal emitter module 240, a strategy emitter module 250, and a results processing module 260. In an embodiment, the signal emitter module 240, the strategy emitter module 250, and the results processing module 260 can represent hardware components that execute the related applications.

The signal emitter module 240, the strategy emitter module 250, and the results processing module 260 can communicate with each other via the API 214 to utilize search terms and user context to identify, classify, compute, query, and build relevant results to a current search query. The signal emitter module 240 can receive a search query and user context 270 from an information handling system, such as information handling system 104 or 106 of FIG. 1. For example, an individual in the United States can utilize information handling system 104 to provide a search query in English with the following terms: "laptop deal under $500". The signal emitter module 240 can receive and process this search query and user context 270 to generate signals to be utilized by the strategy emitter module 250. In an embodiment, the generated signals can provide information that the strategy emitter module 250 can use or consume to generate different strategic probabilities for providing results to the information handling system. For example, the signals can be past purchases signals, laptop product categories signals, deal searcher classification signals, and a price preference signals. The generation of these signals by the signal emitter module 240 is discussed in greater detail with respect to FIG. 3 below.

Figure 3:
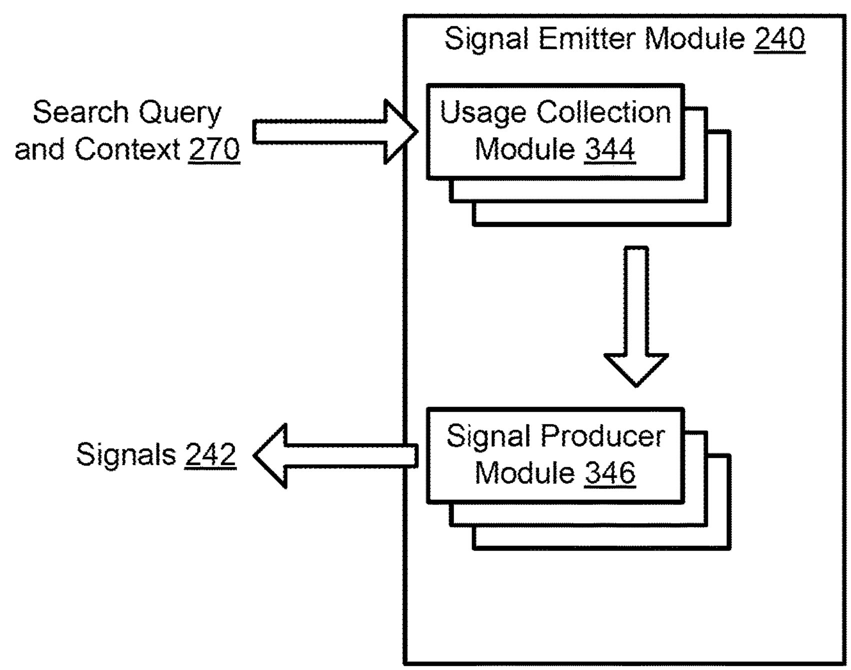
FIG. 3 is a block diagram of a signal emitter module within the processing device according to an embodiment of the present disclosure.

FIG. 3 illustrates a block diagram of the signal emitter module 240 within the processing device 110 according to an embodiment of the present disclosure. In different embodiments, the signal emitter module 240, can be a product name/brand matcher module, a user recommendation engine for locale or previous searches, or the like. The signal emitter module 240 includes multiple identification and extraction modules 344 and multiple signal producer modules 346. In an embodiment, the identification and extraction modules and the signal producer modules 346 can represent hardware components that execute related applications. The usage collection module 344 can receive multiple search queries and user context 270 from multiple information handling systems. The signal emitter modules extract and identify signals from the user query and context. From the example the signals products might be past purchases, laptop product categories, deal searcher classification, and price preferences signals. In an embodiment, the usage collection module 344 can retrieve and combine the behavioral data and the interactional data from multiple information handling systems and multiple search queries. The usage collection module 344 can then store this combined data in a memory that can be accessed in response to a new search query. In an embodiment, the usage collection module 344 can retrieve and combine the data at regular intervals, such as hourly, daily, weekly, monthly, or the like. In an embodiment, the usage collection can be implemented via usage collection systems 460 and a usage processing system 462 as shown in FIG. 4.

Figure 4:
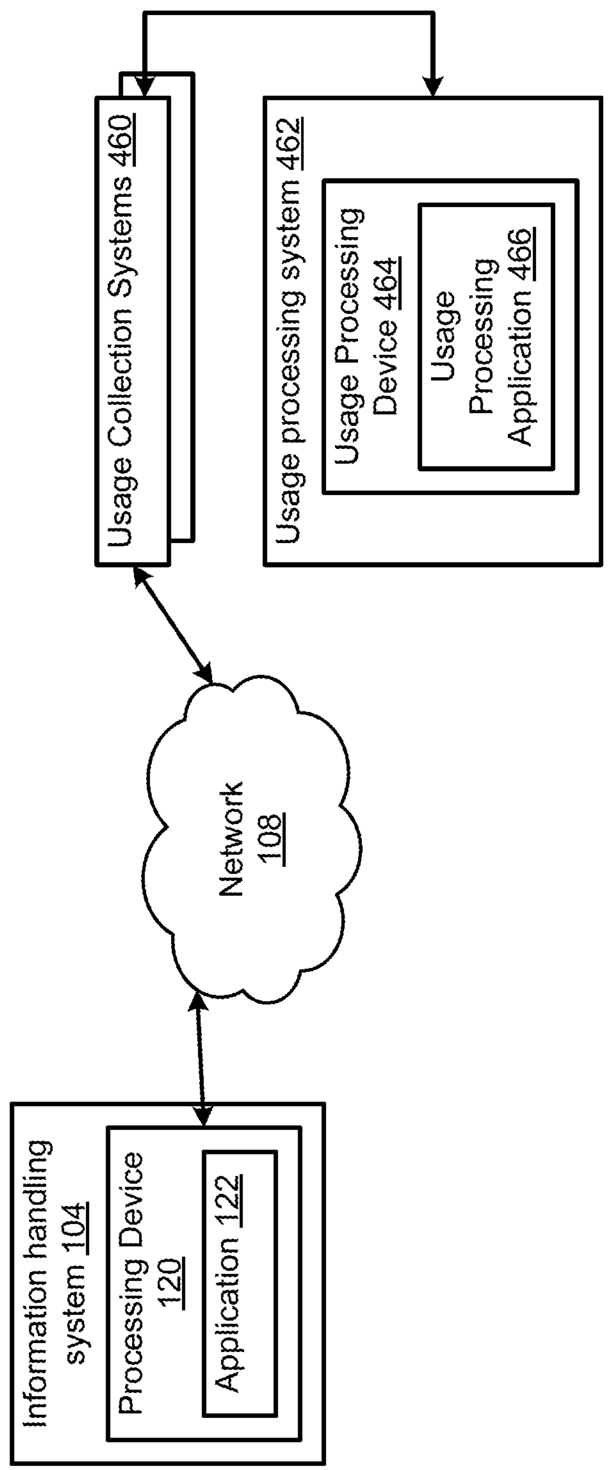
FIG. 4 is a block diagram of usage collection system according to an embodiment of the present disclosure.

FIG. 4 illustrates a block diagram of information handling system 104, one or more usage collection systems 460, and usage processing system 462. The information handling system 104 includes the processing device 120, which in turn executes one or more applications 122. The usage processing system 462 includes a usage processing device 464, which in turn can execute one or more usage processing applications 466. The usage collection systems 460 communicate with the information handling system 104 via the network 108, and communicate with the usage processing system 462.

The usage collection systems 460 can monitor usage by the information handling system 104 and can collect the information. For example, the usage collection systems 460 can collect clicktracking information, user usage, user behaviors, or the like and can provide the usage information to the usage processing system 462. In an embodiment, the clicktracking information can identify links and/or results that were selected. The usage processing device 464 of the usage processing system 462 can receive the usage information from the usage collection systems 460 and can then generate useable information. For example, the usage processing device 462 can analyze, aggregate, expose, or otherwise process the information request from the usage collection systems 460 to generate information that can be consumed by other modules to provide better search results. In an embodiment, this consumable information can be incorporated as a portion of combined data to be utilized by the signal producer module 346 of FIG. 3.

Referring back to FIG. 3, the signal producer module 346 can utilize combined data while analyzing a current search query received from an information handling system, such as information handling system 104 of FIG. 1. In an embodiment, the combined data can include many signals from different extraction modules, such as usage collection and processed data from the usage processing system 462 of FIG. 4, or the like. In an embodiment, the signal producer module 346 can use the combined behavioral and interactional data to determine different signals that can be generated based on the search query terms. For example, the signal producer module 346 can utilize the behavioral and interactional data to determine how many times a product was purchased in response to the current search query terms, how past users interacted with previous results, such as what result was clicked on the most times, or the like to produce signals for each for the information related to the behavioral and interactional data. For example, if the current search query includes the terms "laptop deal under $500", the signal producer module 346 can analyze the behavioral and interactional data to determine how many times a product was purchased after these terms were provided as a search query and produce signals that are associated with the product information associated with the products that were purchased. In an embodiment, the external modules and data sources 109, of FIG. 2, may contain domain specific information that can be returned based on the user query or user context, such as a query that contains product names, and these modules can be utilized during the data retrieval process of the signal emitter module 240.

The signal producer module 346 can also determine if specific previously returned results had been selected more than other results. In an embodiment, results are defined as selected if the results are interacted with, such as viewed, purchased, added to a cart, view the details of, or the like. The signal producer module 346 can make these determinations about the search query and user context 270 and generate the signals 242 in real-time, so that the results for the current search query can be altered based on the signals 242 provided by the signal producer module 346. The signals 242 can include a product category signal, a price preference signal, a deal searcher classification signal, popular by interaction signal, or the like. In an embodiment, the signal producer module 346 can provide the signals 242 to the strategy emitter module 250 as shown in FIG. 2.

Referring back to FIG. 2, the signals 242 are provided to the strategy emitter module 250 via an interface created between the signal emitter module 240 and the strategy emitter module 250 via the API 214. The strategy emitter module 250 can include multiple components that produce a set of probable strategies based on the received signals 242. For example, if the signals 242, for the search query "laptop deal under $500", are for laptop product categories, a deal searcher classification signal, and a price preference signal, the components of the strategy emitter module 250 can produce 85% deals strategy, 83% purchase strategy, and 12% support strategy. The generation of these strategies by the components of the strategy emitter module 250 will be discussed in greater detail with respect to FIG. 5 below.

Figure 5:
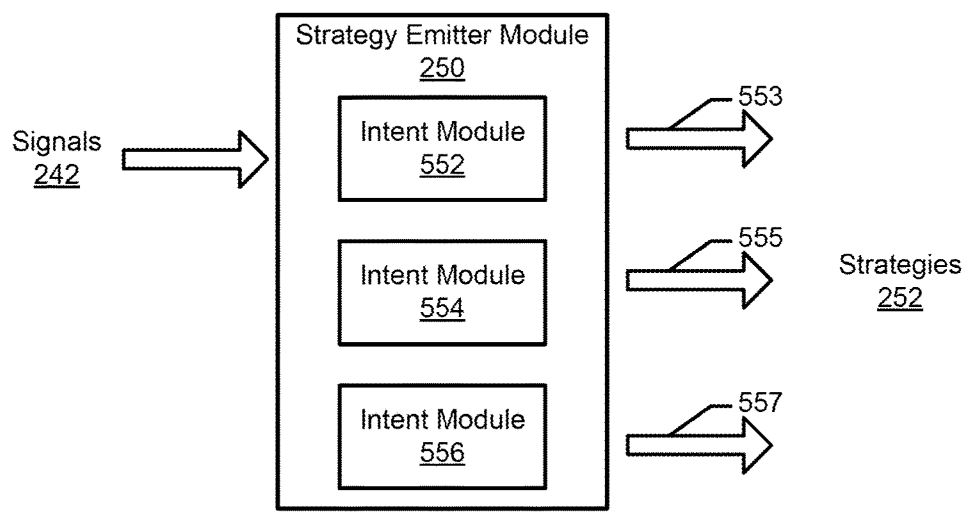
FIG. 5 is a block diagram of a strategy emitter module within the processing device according to an embodiment of the present disclosure.

FIG. 5 illustrates a block diagram of the strategy emitter module 250 of the processing device 110 according to an embodiment of the present disclosure. The strategy emitter module 250 includes intent modules 552, 554, and 556. In an embodiment, the intent modules 552, 554, and 556 can represent hardware components that execute related applications. The intent modules 552, 554, and 556 receive the signals 242, and each of the intent modules can produce a probabilistic strategy based on the received signals. In an embodiment, each of the intent modules 552, 554, and 556 can utilize different algorithms, formulas, machine learning algorithms, or the like to determine the probability that a search query associated with the signals 242 is directed to a particular strategy. As used herein, a strategy is a command that can cause results for the search query to be weighted to a particular type of search.

In an embodiment, the intent module 552 can determine the probability that the search query is directed purchasing an item. In this embodiment, the intent module 552 can generate a purchase strategy 553 that can be provided to the results module 260. In an embodiment, the intent module 554 can determine the probability that the search query is directed customer service support for a product. In this embodiment, the intent module 554 can generate a support strategy 555 that can be provided to the results module 260. In an embodiment, the intent module 556 can determine the probability that the search query is directed information about a company. In this embodiment, the intent module 556 can generate a company information strategy 557 that can be provided to the results module 260.

In an embodiment, the intent modules 552, 554, and 556 can receive signals 242 from the signal emitter module 240 based on a search query including the terms: "I want to buy a new laptop". The signals 242 for this search query can include a context signal, a systems categories signal, and an actionable categories signal. In an embodiment, the context signal 242 can indicate that the search query was received from an information handling system in the United States, and that the search terms are in English. In an embodiment, the systems categories signal 242 can indicate that the search query can be associated with laptops for the home, laptops for work, and gaming laptops. In an embodiment, the actionable categories signal 242 can indicate an action that can result from the search query is the purchase of a system.

The intent modules 552, 554, and 556 can analyze these signals 242 and determine the probability that the search query is associated with its result strategy. For example, intent module 552 can utilize the information in the signals 242 to determine that the probability that the search is related to purchasing products is 100%. The intent module 554 can utilize the information in the signals 242 to determine that the probability that the search is related to customer service support is 0%. The intent module 556 can utilize the information in the signals 242 to determine that the probability that the search is related to company information is 0%. The strategy emitter module 250 can then provide the result module 260 a strategy 553 with an indication of 100% purchasing, a strategy 555 indicating 0% support, and a strategy 557 indicating 0% company information.

In an embodiment, the intent modules 552, 554, and 556 can receive signals 242 from the signal emitter module 240 based on a search query including the terms: "laptop deal under $500". The signals 242 for this search query can include a context signal, a systems categories signal, and an actionable categories signal. In an embodiment, the context signal 242 can indicate that the search query was received from an information handling system in the United States, and that the search terms are in English. In an embodiment, the systems categories signal 242 can indicate that the search query can be associated with laptops for the home, laptops for work, and gaming laptops. In an embodiment, the actionable categories signal 242 can indicate an action that can result from the search query is the purchase of a system and deals.

The intent modules 552, 554, and 556 can analyze these signals 242 and determine the probability that the search query is associated with its result strategy. For example, intent module 552 can utilize the information in the signals 242 to determine that the probability that the search is related to purchasing products is 83%. The intent module 554 can utilize the information in the signals 242 to determine that the probability that the search is related to customer service support is 12%. The intent module 556 can utilize the information in the signals 242 to determine that the probability that the search is related to company information is 83%. The strategy emitter module 250 can then provide the result module 260 an overall strategy 252 that includes multiple individual strategies, such as a strategy 553 with an indication of 83% purchasing, a strategy 555 indicating 83% deals, and a strategy 557 indicating 12% customer support. The results module 260 can then utilize the strategy 252 that combines the individual strategies 553, 555, and 557 to select results for the search query from the external modules and database sources 109 as discussed below with respect to FIG. 2.

Referring back to FIG. 2, the strategies 252 produced by the components of the strategy emitter module 250 can be provided to the results module 260. The results module 260 can utilize the strategy data, such as a name of the strategy, the probability that the search query is directed to the strategy, and any associated signals produced by the signal emitter module 240, to generate results for the search query. For example, the signals and strategies generated from the search query "laptop deal under $500", can cause the results module 260 to access the external modules and data (signal source) 109 and retrieve results that match a union between systems that match the queried laptop, systems that are under $500, systems that for United States/English transactional users, and customer service support. These results 280 can then be provided to the information handling system, such as information handling system 104 or 106 of FIG. 1, that provided the search query. In an embodiment, the external modules and data sources 109 may contain domain specific information that can be returned based on the user query or user context, such as a query that contains product names, and these modules can be utilized during the data retrieval process of the results processing module 260.

Figure 6:
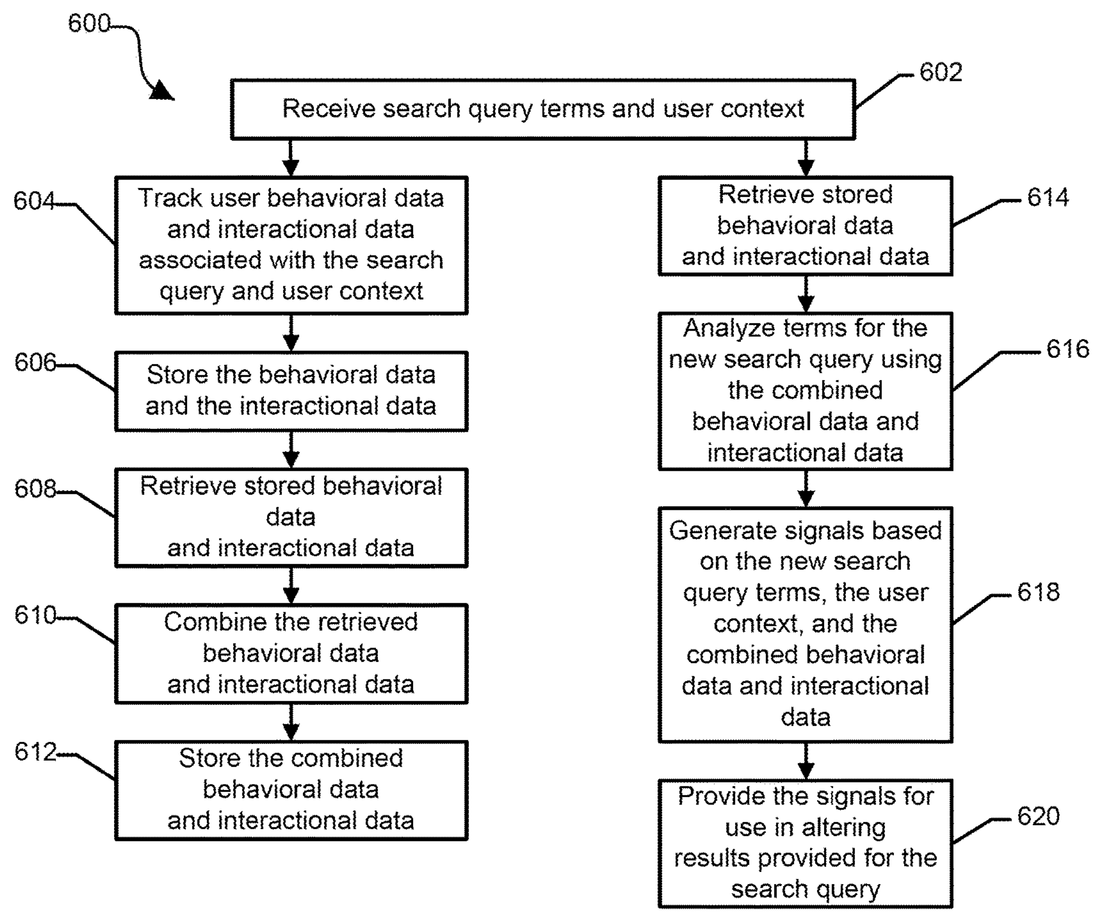
FIG. 6 is a flow diagram illustrating a method for generating signals based search queries and contexts according to an embodiment of the present disclosure.

FIG. 6 illustrates a flow diagram illustrating a method 600 for generating signals based search queries and contexts according to an embodiment of the present disclosure. At block 602, search query terms and user context are received. In an embodiment, the search query terms and user context can be received at a processing device of an information handling system. In an embodiment, the user context can include past interactions with websites of the information handling system, such as items viewed, items purchased, or the like, the location of an individual that provided the search query terms, the language that the search query is made in, or the like.

After the search query terms and user context are received, two different flows are performed. The first flow begins at block 604, and the behavioral data and interactional data associated with the search query terms are tracked. In an embodiment, the behavioral data can be items or results that individuals 'click' or select from a list of results. In an embodiment, the interactional data can be purchases, search queries that were abandoned, ratings provided by an individual, reviews, or the like. The behavioral data and interactional data are stored in a memory at block 606. At block 608, stored behavioral data and interactional data is retrieved. In an embodiment, the stored behavioral data and interactional data can be from multiple search queries with different user contexts that have occurred over a specific amount of time. The retrieved behavioral data and interactional data are combined at block 610. In an embodiment, the behavioral and interactional data can be retrieved and combined at regular intervals, such as hourly, daily, weekly, monthly, or the like. At block 612, the combined data is stored in a memory.

The second flow begins at block 614, and stored behavioral data and interactional data is retrieved. At block 616, terms within the new search query are analyzed based on the combined behavioral data and interactional data. Signals are generated based on the new search query terms, the user context, and the combined behavioral data and interactional data at block 618. In an embodiment, the signals can be a product category signal, a price preference signal, a deal searcher classification signal, or the like. The signals are provided for use in altering results provided in response to the search query at block 620. Depending on the embodiment, the two flows can be performed individually without the other flow being performed, can be performed in parallel, can be performed one after another, or the like.

Figure 7:
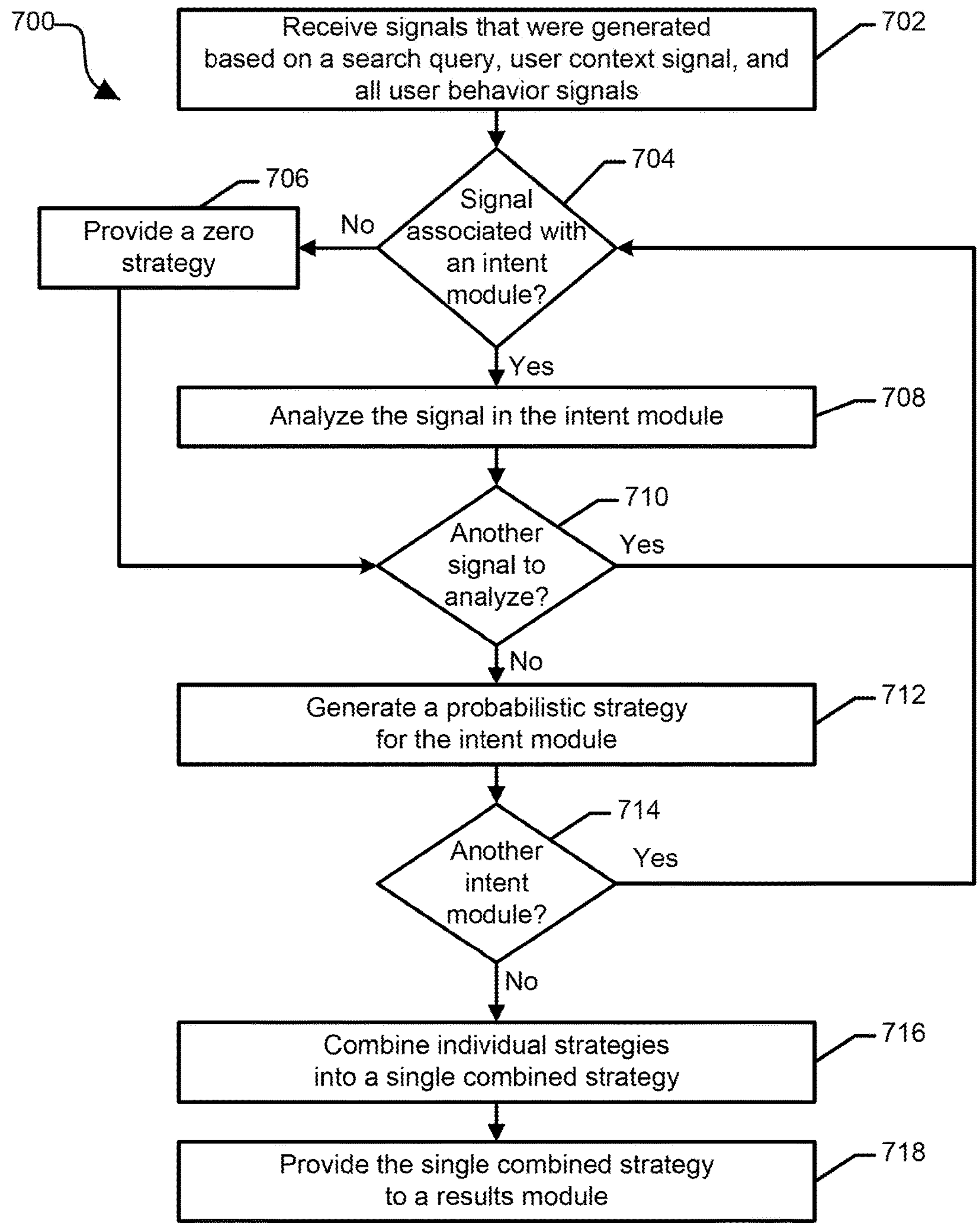
FIG. 7 is a flow diagram illustrating a method for generating strategies in response to signals according to an embodiment of the disclosure.

FIG. 7 illustrates a flow diagram illustrating a method 700 for generating strategies in response to signals according to an embodiment of the disclosure. At block 702, signals generated based on a search query, user context signals, and all user behavior signals are received. In an embodiment, the signals based on a search query can be based on the current query context. In an embodiment, the user context signals can be based on purchase history, past queries by the user, past sessions, or the like. In an embodiment, the user behavior signals can be based on analytics data, such as what actions other users have done after taking similar actions. At block 704, a determination is made whether a signal is associated with an intent module. In an embodiment, an intent module can determine whether a search query is associated with a particular strategy for returning results for the search query, such as purchasing products, customer service support, company information, or the like. If the signal is associated with the intent module, the flow proceeds to block 708, otherwise a zero strategy is provided at block 706. In an embodiment, the zero strategy indicates that the signal is not associated with the strategy of the intent module.

At block 708, the signal is analyzed by an intent module. In an embodiment, the signal can be a context signal, a systems categories signal, an actionable categories signal, or the like. At block 710, a determination is made whether another signal in the received signals is left to be analyzed by the intent module. If so, the flow proceeds as discussed above with respect to block 704, otherwise the flow proceeds to block 712 and a probabilistic strategy for the intent module is generated. In an embodiment, the probabilistic strategy indicates a probability that the search query is directed to the result strategy of the intent module. At block 714, a determination is made whether another intent module is left to analyze the signals. If so, the flow proceeds to block 704, otherwise the individual strategies are combined into a single strategy at block 714. In an embodiment, a combined strategy is a command that can cause results for the search query to be weighted to a particular type of search, such as purchasing products, customer support, company information, deals, or the like. At block 718, the combined strategy is provided to a results module.

Figure 8:
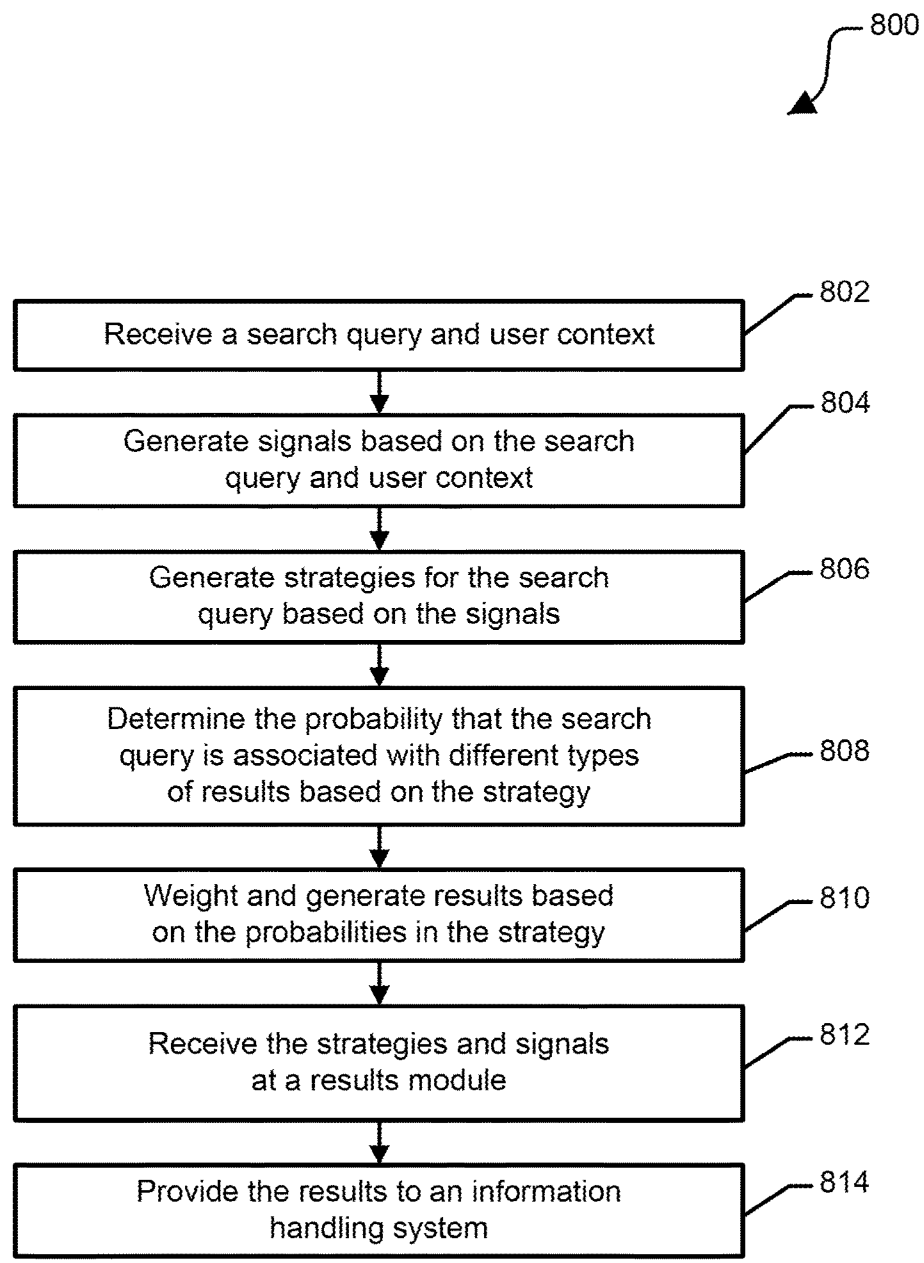
FIG. 8 is a flow diagram illustrating a method for generating results to a search query in response to signals and strategies according to an embodiment of the disclosure.

FIG. 8 illustrates a flow diagram illustrating a method for generating results to a search query in response to signals and strategies according to an embodiment of the disclosure. At block 802, a search query and user context is received. In an embodiment, the search query is a string of terms provided by an information handling system. In an embodiment, the user context is information associated with the user and information handling system providing the search query. For example, the context information can include that the user is located in the United States, that the search terms are in English, and that the user has previously purchased a laptop computer in response to a search query.

At block 804, signals for the search query are generated. In an embodiment, the signals are generated as described above with respect to FIGS. 3 and 6. Strategies for the search query is generated based on the signals at block 806. In an embodiment, the strategies are generated as described above with respect to FIGS. 5 and 7. At block 808, a probability that the search result is associated with different types of results is determined based on the strategy. In an embodiment, the type of results can be products for purchase, customer service support response, company information, deals/campaign response, interactive answers or the like. At block 810, results are weighted and generated based the probabilities in the strategy. At block 812, the strategies and signals are received at a results module. The results are provided to an information handling system at block 814. In an embodiment, the results provided can include results from each result type that has a strategy above 0%.

Figure 9:
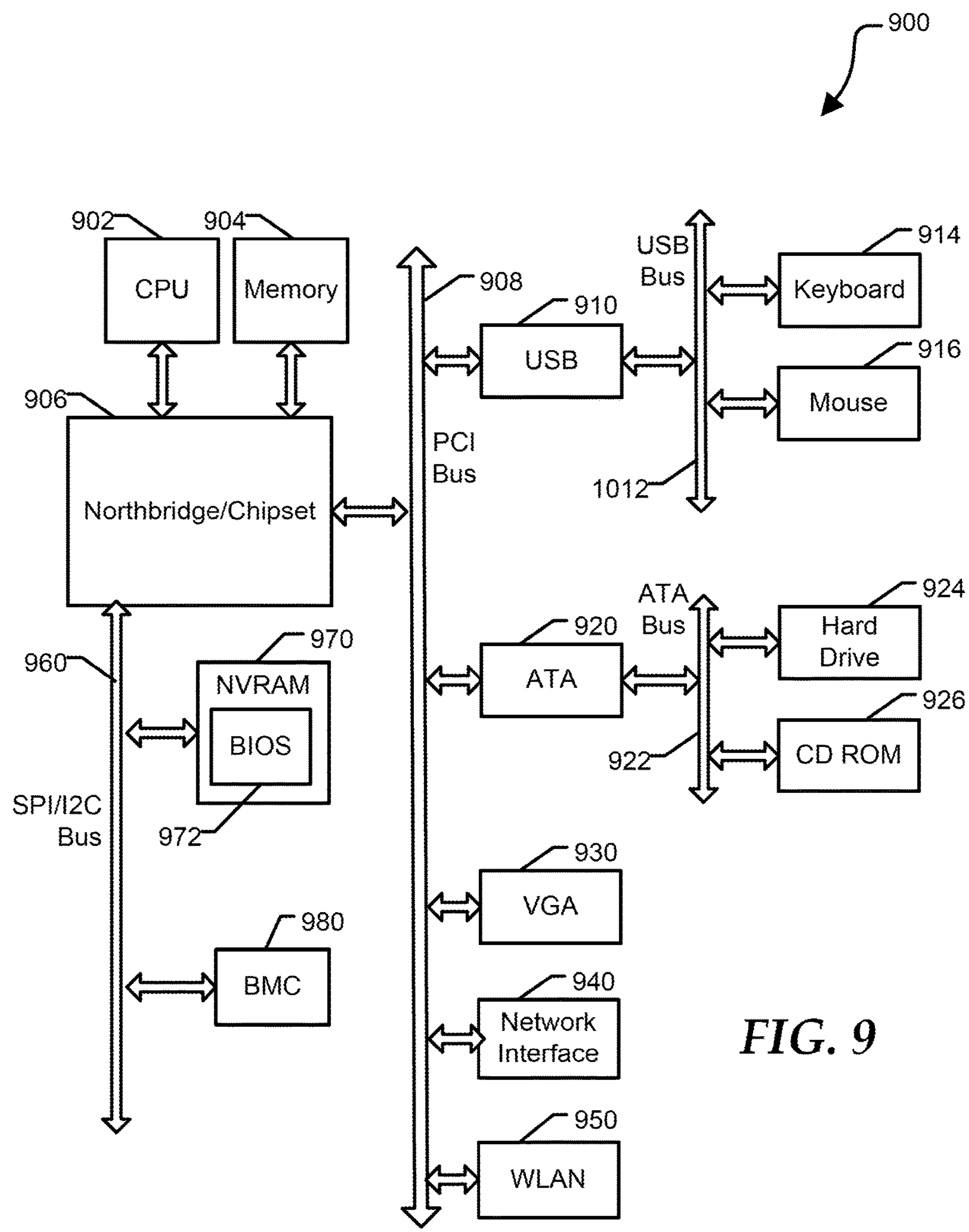
FIG. 9 is a block diagram of a general information handling system according to an embodiment of the present disclosure.

FIG. 9 shows an information handling system 900 including a processor 902, a memory 904, a northbridge/chipset 906, a PCI bus 908, a universal serial bus (USB) controller 910, a USB 912, a keyboard device controller 914, a mouse device controller 916, a configuration an ATA bus controller 920, an ATA bus 922, a hard drive device controller 924, a compact disk read only memory (CD ROM) device controller 926, a video graphics array (VGA) device controller 930, a network interface controller (NIC) 940, a wireless local area network (WLAN) controller 950, a serial peripheral interface (SPI) bus 960, a NVRAM 970 for storing BIOS 972, and a baseboard management controller (BMC) 980. BMC 980 can be referred to as a service processor or embedded controller (EC). Capabilities and functions provided by BMC 980 can vary considerably based on the type of information handling system. For example, the term baseboard management system is often used to describe an embedded processor included at a server, while an embedded controller is more likely to be found in a consumer-level device. As disclosed herein, BMC 980 represents a processing device different from CPU 902, which provides various management functions for information handling system 900. For example, an embedded controller may be responsible for power management, cooling management, and the like. An embedded controller included at a data storage system can be referred to as a storage enclosure processor.

For purpose of this disclosure information handling system 900 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 900 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 900 can include processing resources for executing machine-executable code, such as CPU 902, a programmable logic array (PLA), an embedded device such as a System-on-a-Chip (SoC), or other control logic hardware. Information handling system 900 can also include one or more computer-readable medium for storing machine-executable code, such as software or data.

System 900 can include additional processors (not shown at FIG. 1) that are configured to provide localized or specific control functions, such as a battery management controller. Bus 960 can include one or more busses, including a SPI bus, an I2C bus, a system management bus (SMBUS), a power management bus (PMBUS), and the like. BMC 980 can be configured to provide out-of-band access to devices at information handling system 900. As used herein, out-ofband access herein refers to operations performed prior to execution of BIOS 972 by processor 902 to initialize operation of system 900.

BIOS 972 can be referred to as a firmware image, and the term BIOS is herein used interchangeably with the term firmware image, or simply firmware. BIOS 972 includes instructions executable by CPU 902 to initialize and test the hardware components of system 900, and to load a boot loader or an operating system (OS) from a mass storage device. BIOS 972 additionally provides an abstraction layer for the hardware, such as a consistent way for application programs and operating systems to interact with the keyboard, display, and other input/output devices. When power is first applied to information handling system 900, the system begins a sequence of initialization procedures. During the initialization sequence, also referred to as a boot sequence, components of system 900 are configured and enabled for operation, and device drivers can be installed. Device drivers provide an interface through which other components of the system 900 can communicate with a corresponding device.

Information handling system 900 can include additional components and additional busses, not shown for clarity. For example, system 900 can include multiple processor cores, audio devices, and the like. While a particular arrangement of bus technologies and interconnections is illustrated for the purpose of example, one of skill will appreciate that the techniques disclosed herein are applicable to other system architectures. System 900 can include multiple CPUs and redundant bus controllers. One or more components can be integrated together. For example, portions of northbridge/chipset 906 can be integrated within CPU 902. Additional components of information handling system 900 can include one or more storage devices that can store machine-executable code, one or more communications ports for communicating with external devices, and various input and output (I/O) devices, such as a keyboard, a mouse, and a video display. An example of information handling system 900 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 900 can include a set of instructions that can be executed to cause the information handling system to perform any one or more of the methods or computer based functions disclosed herein. The information handling system 900 may operate as a standalone device or may be connected to other computer systems or peripheral devices, such as by a network.

In a networked deployment, the information handling system 900 may operate in the capacity of a server or as a client user computer in a server-client user network environment, or as a peer computer system in a peer-to-peer (or distributed) network environment. The information handling system 900 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 900 can be implemented using electronic devices that provide voice, video or data communication. Further, while a single information handling system 900 is illustrated, the term "system" shall also be taken to include any collection of systems or sub-systems that individually or jointly execute a set, or multiple sets, of instructions to perform one or more computer functions.

The information handling system 900 can include a disk drive unit and may include a computer-readable medium, not shown in FIG. 9, in which one or more sets of instructions, such as software, can be embedded. Further, the instructions may embody one or more of the methods or logic as described herein. In a particular embodiment, the instructions may reside completely, or at least partially, within system memory 904 or another memory included at system 900, and/or within the processor 902 during execution by the information handling system 900. The system memory 904 and the processor 902 also may include computer-readable media.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:

receiving, at a processing device, a first search query including first search terms, and user context associated with the first search query;

in response to receiving the first search query, tracking behavioral data and interactional data associated with the first search query and the user context including:

retrieving the behavioral data and the interactional data from previous search queries that have occurred over a period of time with different user contexts;

combining the retrieved behavioral data and the interactional data to create combined behavioral data and interactional data; and storing in a memory the combined behavioral data and interactional data; and retrieving combined behavioral data and interactional data from previous particular search queries that have occurred over a particular period of time with different particular user contexts, including:

analyzing the first search terms using the combined behavioral data and interactional data;

generating signals based on the first search terms, the user context, and the combined behavioral data and interactional data;

determining strategic probabilities associated with an intent of the first search query based on the generated signals that the first search terms are directed to a particular strategy, wherein the particular strategy causes results for the first search query to be weighted to a particular type of search;

generating an overall strategy for the first search query based on the strategic probabilities;

providing the signals for use in altering the results in real-time based on the overall strategy; and displaying the results on a display device.

2. The method of claim 1, further comprising:

tracking the behavioral data and interactional data for the previous search queries and previous user contexts prior to receiving the first search query; and storing the behavioral data and the interactional data.

3. The method of claim 2, further comprising:

determining whether specific previously returned results have been selected more than other results.

4. The method of claim 3, wherein the behavioral data and the interactional data are combined at regular intervals.

5. The method of claim 3, wherein the behavioral data and the interactional data are retrieved at regular intervals.

6. The method of claim 1, wherein the behavioral data can be results that have been selected from a previous list of results provided in response to the previous search queries.

7. The method of claim 1, wherein the interactional data includes purchases, search queries that were abandoned, ratings provided by an individual, and reviews.

8. A method comprising:

combining behavioral data and interactional data from previous search queries that have occurred over a period of time with different user contexts to create combined behavioral data and interactional data;

receiving, at a processing device, a first search query including first search terms, and user context associated with the first search query;

in response to receiving the first search query:

tracking behavioral and interactional data associated with the first search query and the user context including storing the behavioral data and the interactional data; and retrieving the combined behavioral data and interactional data from memory including:

analyzing the first search terms using the combined behavioral data and interactional data;

generating, by the processing device, signals based on the first search terms, the user context, and the combined behavioral data and interactional data;

determining strategic probabilities associated with an intent of the first search query based on the generated signals that the first search terms are directed to a particular strategy, wherein the particular strategy causes results for the first search query to be weighted to a particular type of search;

generating an overall strategy for the first search query based on the strategic probabilities;

providing the signals for use in altering the results to be provided in response to the first search query based on the overall strategy; and displaying the results on a display device.

9. The method of claim 8, wherein the previous search queries are all directed to websites provided by an information handling system that includes the processing device.

10. The method of claim 8, wherein the behavioral data and the interactional data are retrieved and combined at regular intervals.

11. The method of claim 8, wherein the behavioral data and the interactional data are combined prior to receiving search queries and user contexts.

12. The method of claim 8, wherein the behavioral data can be results that have been selected from a previous list of results provided in response to the previous search queries.

13. The method of claim 8, wherein the interactional data includes purchases, search queries that were abandoned, ratings provided by an individual, and reviews.

14. An information handling system comprising:

a memory to store combined behavioral data and interactional data associated with search queries; and a processing device to communicate with the memory, the processing device to receive a first search query including first search terms, and user context associated with the first search query, to retrieve from the memory and combine at regular intervals behavioral data and interactional data from previous search queries that occurred over a period of time with different user contexts to create the combined behavioral data and interactional data, to analyze the first search terms using the combined behavioral data and interactional data, to generate signals based on the first search terms, the user context, and the combined behavioral data and interactional data, to determine strategic probabilities associated with an intent of the first search query based on the generated signals that the first search terms are directed to a particular strategy, wherein the particular strategy causes results for the first search query to be weighted to a particular type of search, to generate an overall strategy for the first search query based on the strategic probabilities, and to provide the signals for use in altering the results to be provided in response to the first search query for display on a display device based on the overall strategy.

15. The information handling system of claim 14, the processing device further to track the behavioral data and interactional data for the previous search queries and previous user contexts prior to receiving the first search query, and to store the behavioral data and the interactional data.

16. The information handling system of claim 15, the processing device further to communicate with a usage collection system and a usage processing system, wherein the usage collection system monitors usage information of the information handling system and provides the usage information to the usage processing system.

17. The information handling system of claim 16, wherein the usage processing system generates signal based at least in part on the usage information.

18. The information handling system of claim 16, wherein the behavioral data and the interactional data are combined prior to receiving search queries and user contexts.

19. The information handling system of claim 14, wherein the behavioral data can be results that have been selected from a previous list of results provided in response to the previous search queries.

20. The information handling system of claim 14, wherein the interactional data includes purchases, search queries that were abandoned, ratings provided by an individual, and reviews.

* * * * *